United States Patent
Bradley et al.

(10) Patent No.: US 8,108,302 B1
(45) Date of Patent: *Jan. 31, 2012

(54) SYSTEMS AND METHODS FOR DETERMINING THE LIKELIHOOD THAT A LOAN CLOSES

(75) Inventors: Michael G. Bradley, Chesterfield, MO (US); J. Douglas Gordon, Arlington, VA (US); Matthew J. Klena, Falls Church, VA (US); Pamela W. Sims, Arlington, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/540,988

(22) Filed: Aug. 13, 2009

Related U.S. Application Data

(63) Continuation of application No. 10/700,045, filed on Nov. 4, 2003, now Pat. No. 7,593,890.

(51) Int. Cl.
*G06Q 40/00* (2006.01)
(52) U.S. Cl. .......................... 705/38; 705/35
(58) Field of Classification Search .................. 705/38, 705/35
See application file for complete search history.

(56) References Cited

U.S. PATENT DOCUMENTS

| | | | |
|---|---|---|---|
| 4,739,478 A | 4/1988 | Roberts et al. | |
| 4,876,648 A | 10/1989 | Lloyd | |
| 5,361,201 A | 11/1994 | Jost et al. | |
| 5,414,621 A | 5/1995 | Hough | |
| 5,680,305 A | 10/1997 | Apgar, IV | |
| 5,699,527 A | 12/1997 | Davidson | |
| 5,742,775 A | 4/1998 | King | |
| 5,774,883 A | 6/1998 | Andersen et al. | |
| 5,857,174 A | 1/1999 | Dugan | |
| 5,940,812 A * | 8/1999 | Tengel et al. | 705/38 |
| 5,995,947 A | 11/1999 | Fraser et al. | |
| 6,038,554 A | 3/2000 | Vig | |
| 6,112,190 A | 8/2000 | Fletcher et al. | |
| 6,115,694 A | 9/2000 | Cheetham et al. | |
| 6,141,648 A | 10/2000 | Bonissone et al. | |
| 6,178,406 B1 | 1/2001 | Cheetham et al. | |
| 6,401,070 B1 | 6/2002 | McManus et al. | |
| 6,484,153 B1 | 11/2002 | Walker et al. | |
| 6,609,109 B1 | 8/2003 | Bradley et al. | |
| 6,842,738 B1 | 1/2005 | Bradley et al. | |
| 7,509,261 B1 | 3/2009 | McManus et al. | |

(Continued)

OTHER PUBLICATIONS

Ted Cornwell. (Dec. 1999). Expanded role for scoring. National Mortgage News, 24(13), 1,28. Retrieved Sep. 19, 2011.*

(Continued)

*Primary Examiner* — Narayanswamy Subramanian
*Assistant Examiner* — Kito R Robinson
(74) *Attorney, Agent, or Firm* — Finnegan, Henderson, Farabow, Garrett & Dunner, LLP

(57) ABSTRACT

Systems and methods are provided for determining an indication that an application for a mortgage loan to secure a property may result in closing of the loan transaction. In one embodiment, a method includes receiving application information, such that the application information includes at least borrower information, property information, and a first interest rate; receiving home value information, such that the home value information represents an estimated value of the property; receiving a second interest rate; and determining the indication based on the received application information, received home value information, and received second interest rate, such that the indication represents a likelihood that the mortgage loan may result in closing.

9 Claims, 11 Drawing Sheets

U.S. PATENT DOCUMENTS

| | | |
|---|---|---|
| 2002/0035520 A1 | 3/2002 | Weiss |
| 2003/0135451 A1 | 7/2003 | O'Brien et al. |
| 2004/0225594 A1 | 11/2004 | Nolan et al. |
| 2005/0240516 A1* | 10/2005 | Crocker .......................... 705/38 |

OTHER PUBLICATIONS

Freddie Mac; Loan Prospector® Classic, Our Original Loan Evaluation Service; Fact Sheets, 2001-2004 (31 pages).

Freddie Mac; Getting Started with Loan Prospector® Automated Underwriting Service; 2002 (40 pages).

Freddie Mac; Getting Started with Loan Prospector® Automated Underwriting Service; 2003 (40 pages).

Freddie Mac; Loan Prospector® Automated Underwriting Service (AUS) Training and User Guide; Feb. 2003 (447 pages).

Freddie Mac; Quick Reference Notes for Feb. 2003 Loan Prospector Automated Underwriting System—Training and User Guide (Feb. 2003) (116 pages).

Freddie Mac; Getting Started with Loan Prospector® Automated Underwriting Service; 2004 (40 pages).

Freddie Mac; Loan Prospector®—Getting to Yes training guide; Nov. 2005 (333 pages).

Freddie Mac; Loan Prospector® Functionality Guide; Apr. 2008 (59 pages).

Freddie Mac; Loan Prospector®—Getting to Yes training guide; Apr. 2008 (321 pages).

Freddie Mac; Getting Started with Loan Prospector®; Jun. 2008 (50 pages).

Freddie Mac; Loan Prospector® Documentation Matrix; Jun. 2008 (14 pages).

U.S. Appl. No. 09/134,161, filed Aug. 14, 1998, entitled "System and Method for Providing Property Value Estimates" to Michael G. Bradley et al.

U.S. Appl. No. 09/728,061, filed Dec. 4, 2000, entitled "Method for Forecasting House Prices Using a Dynamic Error Correction Model" to Douglas A. McManus et al.

Stanton, Thomas H. Credit scoring and loan scoring as tools for improved management of federal credit programs. Financier. Philadelphia: Summer 1999. vol. 6, Iss. 2/3; p. 24.

Brendsel, Leland C. Comment: Freddie Makes Risk Management a Top Priority. American Banker. New York, N.Y.: May 23, 1995. vol. 160, Iss. 97; p. 15.

http://www.harlandfinancialsolutions.com/ProductsAndServices/MortgageSolutions/PointofSale/Interlinqe3OriginationClient.

http://freddiemac.com/news/archives2002/celebrate_061002.htm.

Office Action mailed Dec. 20, 2007 in U.S. Appl. No. 10/700,045, filed Nov. 4, 2003 (18 pages).

Interview Summary mailed Apr. 17, 2008 in U.S. Appl. No. 10/700,045, filed Nov. 4, 2003 (2 pages).

Office Action mailed Oct. 24, 2008 in U.S. Appl. No. 10/700,045, filed Nov. 4, 2003 (14 pages).

Interview Summary mailed Feb. 2, 2009 in U.S. Appl. No. 10/700,045, filed Nov. 4, 2003 (2 pages).

Notice of Allowance and Interview Summary mailed May 8, 2009 in U.S. Appl. No. 10/700,045, filed Nov. 4, 2003 (12 pages).

* cited by examiner

| 1. | FALLOUT SCORE = 600    \\* VARIABLES ARE MULTIPLIED BY \ |
|---|---|
| 2. | +500*(INTEREST_RATE_SPREAD)    \\** parameters or weights **/ |
| 3. | +50*DAYS_UNTIL_CLOSE |
| 4. | +1*CREDITSCORE |
| 5. | -0.5*MCRED |
| 6. | +5*30-DAY |
| 7. | +1*60-DAY |
| 8. | +10*FIXED |
| 9. | +20*JUMBO |
| 10. | +3.5*30-YEAR |
| 11. | -5*ARM |
| 12. | -20*15-YEAR |
| 13. | +100*COMBINED_POINT_VALUE |
| 14. | +100*ZONE_POINT_VALUE |
| 15. | +3*PURCHASE |
| 16. | +20*REFINANCE |
| 17. | +10*CASH_OUT |
| 18. | +10*NUMBER_OF_POINTS_PAID |
| 19. | -10*FEEPCT |
| 20. | +2*LTV |
| 21. | +20*VOLATILITY |
| 22. | +100*DOCS_DRAWN |
| 23. | |
| 24. | \\** scaling score to a range **\ |
| 25. | If LOAN FALLOUT SCORE < 300 then LOAN FALLOUT SCORE = 300 |
| 26. | If LOAN FALLOUT SCORE > 900 then LOAN FALLOUT SCORE = 900 |

FIG. 7

Sample Web Page With Result

Prepared For:  Lender (or Appraiser) Name

LOAN FALLOUT SCORE FOR LOAN NUMBER 100: 300

Property Information:
Street Address: 9999 ANYWHERE DRIVE
City: ROCHESTER  State: NY  Zip: 14621 – 1234

Scores below 500 are at highest risk of falling out (or not closing)
Scores between 500 and 600 are at moderate risk of falling out
Scores above 700 have lowest risk of falling out (likely to close)

FIG. 8

| LOAN NUMBER | CLOSING DATE | OUT-COME | INTEREST RATE SPREAD | VOLATI-LITY | CREDIT SCORE | COMBINED POINT VALUE | DOCS DRAWN |
|---|---|---|---|---|---|---|---|
| 1 | May 1, 2003 | 1 | 0.1 | 0 | 775 | 400 | 1 |
| 2 | NONE | 0 | -0.5 | 0.5 | 400 | 800 | 0 |
| 3 | NONE | 0 | -1.0 | 0 | 450 | 900 | 1 |
| 4 | May 15, 2003 | 1 | 0.1 | 0 | 800 | 500 | 1 |
| ... | | | | | | | |
| ... | | | | | | | |
| Nth Loan | June 1, 2002 | 1 | 0 | 0 | 790 | 500 | 0 |

FIG. 11

SYSTEMS AND METHODS FOR DETERMINING THE LIKELIHOOD THAT A LOAN CLOSES

This application is a continuation of application Ser. No. 10/700,045, filed Nov. 4, 2003 now U.S. Pat. No. 7,593,890, which is incorporated herein by reference.

BACKGROUND OF THE INVENTION

I. Field of the Invention

The present invention generally relates to financial systems and to systems and methods for processing financial information. More particularly, the invention relates to systems and methods for determining the likelihood that a loan will result in a closing.

II. Background Information

When a borrower submits a mortgage application to a lender (or mortgage broker), the borrower may be offered an interest rate for the mortgage loan. The interest rate is usually offered for a set period of time (referred to as a lock period or lock-in period), such as a 30-day lock or a 45-day lock. During the lock-in period, the lender processes the mortgage loan application. The lender's process may include, inter alia, verifying borrower salary information, verifying borrower credit history, receiving a property valuation report, and receiving a county title records search report that confirms ownership or identifies prior liens. This processing (also referred to as workflow) of the mortgage loan application may eventually culminate in a closing. In a real estate transaction, "closing" (also known as the "close") means the final procedure or meeting in which documents are executed, which results in a completion of the loan transaction.

During the lock-in period while the lender processes the mortgage loan application, the borrower essentially waits for the closing. Although the borrower often has a guaranteed interest rate locked in for the closing, current interest rates may fluctuate higher or lower in the period before the closing. If interest rates rise before the closing, the borrower will be better off keeping the locked in interest rate and closing on the mortgage loan, since a higher interest rate means the borrower pays more interest over the term of the mortgage loan. If interest rates drop before the closing, the borrower might be tempted not to close with the locked in interest rate, since a lower interest rate means that the borrower pays less over the life of the loan. On the other hand, even when current interest rates drop, the borrower may decide to forgo a lower interest rate for various reasons. For example, if the lower interest rate is only marginally lower (e.g., 0.1%), the borrower may decide it is not worth the time and effort to pursue getting another mortgage loan with a minimally lower interest rate. When the borrower decides not to close, the borrower's mortgage loan application is considered a "fallout" application, since it falls out of the mortgage loan workflow.

When a borrower's mortgage loan application is a fallout application (not closing), the lender (as well as the appraiser and title company) would have expended resources to process the mortgage loan application up until the point it became a "fallout" application. When the volume of mortgage loan applications is heavy, such as during a (re)financing surge, a lender may turn away, or delay the processing of other mortgage loan applicants to process a mortgage loan application that falls out. As such, there is a need to determine whether a specific loan may fallout, so that a lender may prioritize the workflow associated with mortgage loan applications. Similarly, an appraisal firm, title company, or other entity doing work on the loan application may need to know the likelihood of fallout to prioritize its work. Further, sometimes these entities are not paid for their work if the loan does not close.

SUMMARY OF THE INVENTION

Accordingly, the present invention is directed to systems and methods for processing financial information and, more particularly, systems and methods for determining the likelihood that a loan will close.

A financial system consistent with the systems and methods of the present invention may receive application information, such that the application information includes at least borrower information, property information, and a first interest rate; receive home value information, such that the home value information represents an estimated value of the property; receive a second interest rate; and determine the indication based on the received application information, received home value information, and received second interest rate, such that the indication represents a likelihood that the mortgage loan may close.

In another embodiment of the invention, systems and methods are provided for processing one or more mortgage loan applications based on a score. For example, systems and methods consistent with the invention may receive information representative of a mortgage loan application for a property; and determine the score based on the received information, such that the score represents a likelihood that the mortgage loan application may close. Moreover, in an aspect of the invention, processing of the mortgage loan applications may be performed, such that at least one of the mortgage loan applications is processed before another mortgage loan application based on the determined score for at least one mortgage loan application.

In yet another embodiment, systems and methods consistent with the invention may be used in performing appraisals on one or more properties based on scores, wherein each of the scores indicates whether a mortgage loan application is likely to result in a closing. For example, systems and methods consistent with the invention may receive a first score for a first property of the one or more properties and receive a second score for a second property of the one or more properties. It may then perform a first appraisal of the first property before a second appraisal of the second property, when the first score indicates a greater likelihood of closing than the second score.

In yet another embodiment, systems and methods consistent with the invention may be used in performing title searches on one or more properties based on scores, wherein each of the scores indicates whether a mortgage loan application is likely to result in a closing. For example, systems and methods consistent with the invention may receive a first score for a first property of the one or more properties and receive a second score for a second property of the one or more properties. It may then perform a first title search of the first property before a second title search of the second property, when the first score indicates a greater likelihood of closing than the second score.

Additional features and advantages of the invention will be set forth in part in the description which follows and in part will be obvious from the description, or may be learned by practice of the invention. The objectives and advantages of the invention may be realized and attained by the system and method particularly described in the written description and claims hereof as well as the appended drawings.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings:

FIG. 7 shows an exemplary model for determining an indication that a mortgage loan application may close, consistent with the systems and methods of the invention;

FIG. 8 depicts an exemplary web page interface for providing a Fallout Score, consistent with the systems and methods of the invention;

FIG. 11 shows an exemplary table of information for determining model coefficients, consistent with, the systems and methods of the invention.

DETAILED DESCRIPTION

Reference will now be made in detail to the invention, examples of which are illustrated in the accompanying drawings. Wherever possible, the same reference numbers will be used throughout the drawings to refer to the same or like parts.

Systems and methods consistent with the invention permit an entity, using a computing platform (or computer), to determine an indication of whether a mortgage loan application is likely to result in a closing. In one aspect of the invention, the indication is determined in the form of a score (also referred to herein as a Fallout Score). When a score is used, a relatively low score may indicate that the mortgage loan application is less likely to result in closing of a mortgage, while a relatively high score may indicate that the mortgage loan application is likely to result in closing. The determined indication (or score) may then be provided to any entity, such as a lender, appraiser, or title company, so that the entity may prioritize its resources when processing mortgage loan applications. For example, the entity may prefer to first process loans that are more likely to close than loans that are less likely to close.

Figure 1:
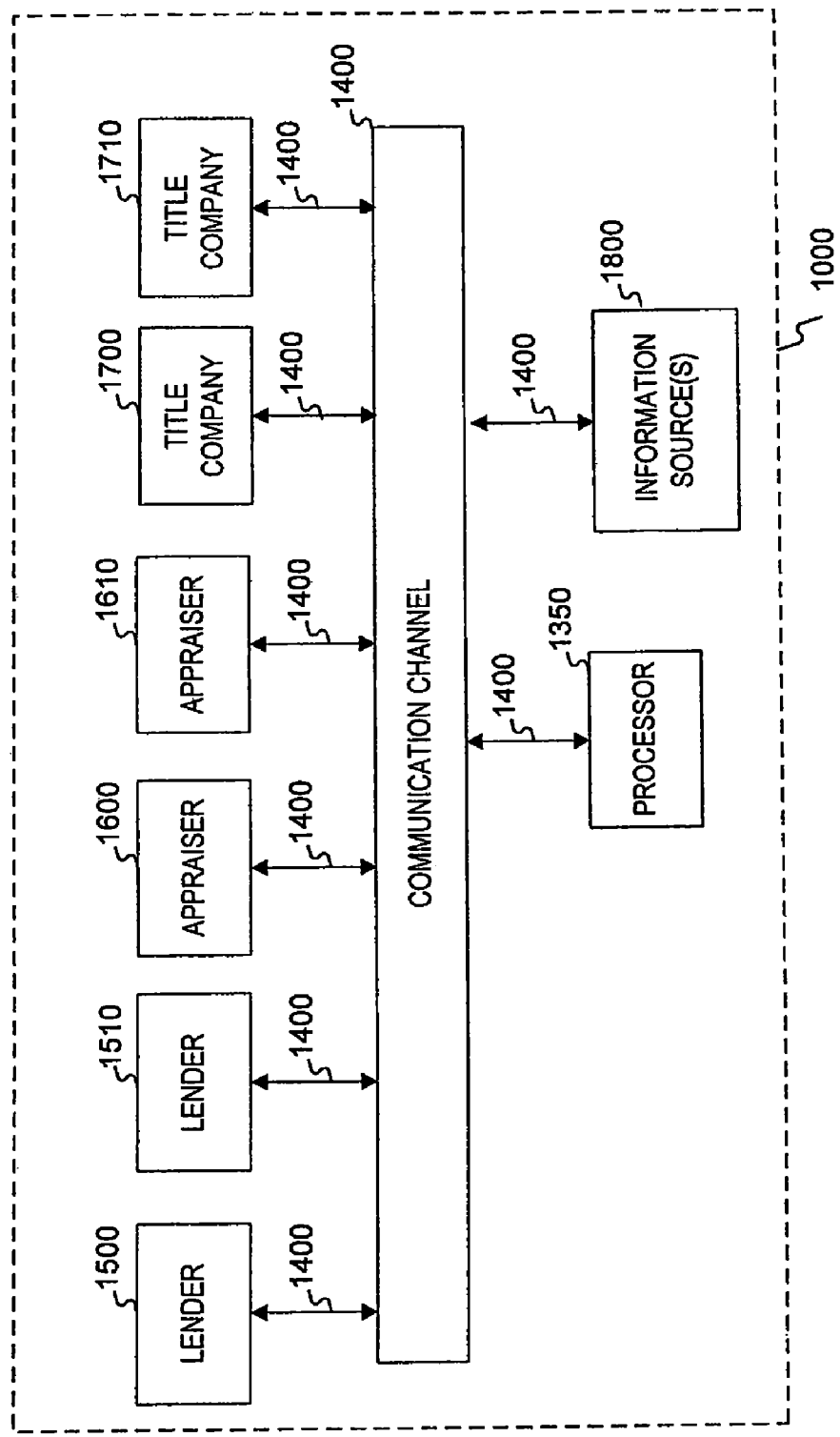
FIG. 1 illustrates an exemplary system environment, consistent with the systems and methods of the invention.

FIG. 1 shows an exemplary system 1000 for determining an indication of whether a mortgage loan application is likely to result in a closing. Referring to FIG. 1, the system includes a communication channel 1400, one or more lenders 1500, 1510, one or more appraisers 1600, 1610, one or more title search and/or title insurance companies 1700, 1710 (also referred to herein as "title companies"), information source(s) 1800, and a processor 1350.

Lenders 1500, 1510 may include a financial entity, such as a bank, mortgage bank, mortgage broker, mortgage originator, and/or any other entity seeking an indication of whether a mortgage loan application is likely to result in a closing.

Appraisers 1600, 1610 may include an entity that estimates the value of a property. For example, the appraiser may be an individual certified (or registered) to perform an appraisal of real property by, inter alia, visiting the property, performing a market analysis and estimating its market value. Alternatively, the appraiser may simply be a broker who provides his or her estimate of value (known as a broker's price opinion), or the appraised value might be derived from an automated valuation model.

Title companies 1700, 1710 may include an entity that performs a title search and/or insures (or warrants) the title against defects in the title or encumbrances against the asset.

Information source(s) 1800 may include internal, external, proprietary, and/or public databases, such as financial databases and demographic databases. The information source(s) 1800 may include (or have access to) interest rate information, credit history, credit ratings (or scores), salary information, estimates of property values, median and/or average or actual housing pricing in geographic areas (or regions), such as a street, neighborhood, ZIP code, city, county, or state. Some examples of such sources of information include DataQuick Information Systems, International Data Management Inc., First American Corporation, county property and/or tax records, TransUnion LLC, Equifax Inc., Experian, Department of Commerce, and Bureau of Labor and Statistics.

Processor 1350 may include any entity (or data processor therein) capable of determining an indication of whether a mortgage loan application is likely to result in a closing. Processor 1350 may also be capable of providing that indication to, for example, lender 1500, appraiser 1600, title company 1700, and/or any other entity requesting the indication.

Figure 2:
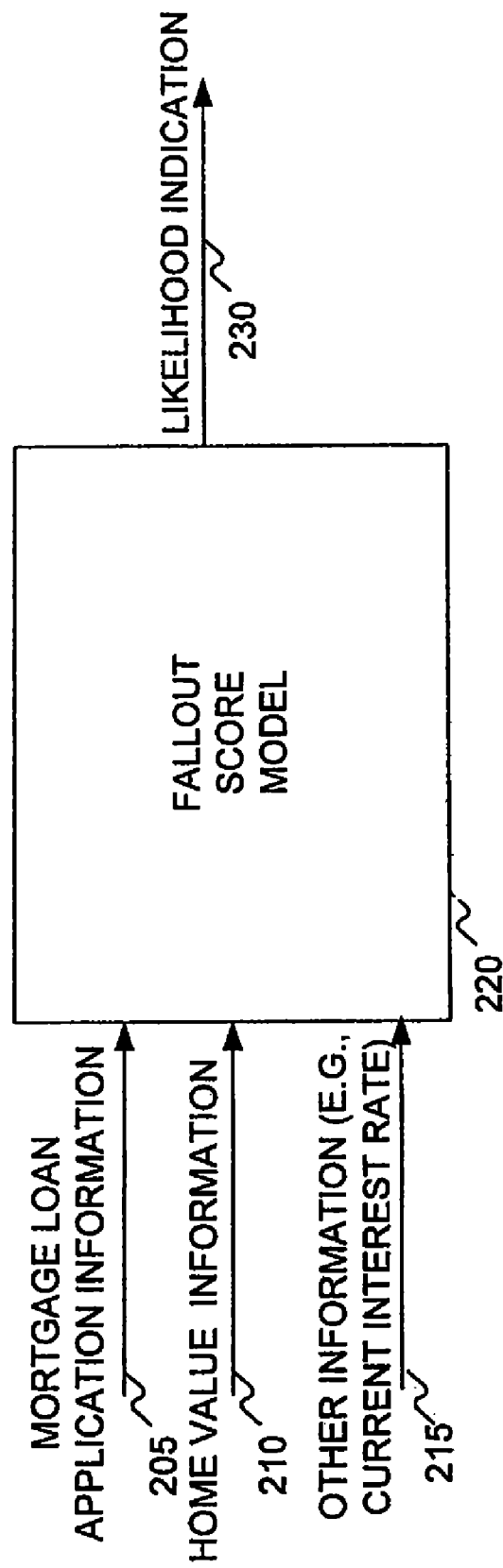
FIG. 2 is an exemplary block diagram for determining an indication that a mortgage loan application may close, consistent with the systems and methods of the invention.

FIG. 2 depicts a functional block diagram associated with providing an indication of whether a mortgage loan application is likely to result in a closing. Referring to FIGS. 1 and 2, processor 1350 may receive from an entity (e.g., lender 1500) mortgage loan application information 205, such as information commonly included on a mortgage loan application. Mortgage loan application information 205 may include transaction details, such as the interest rate at which the borrower may close (also referred to as the locked interest rate), the proposed closing date (or number of days the locked interest rate is available), and any points and fees charged for the loan, those that are paid at application and those paid later. Processor 1350 may also receive home value information 210 that estimates the value of the property, which is the subject of the mortgage loan application (also referred to herein as the subject property). Home value information 210 may further include an average (or median) property value for the region corresponding to the subject property. For example, home value information 210 may include a home value estimate for the property and an average home value for the ZIP code associated with the subject property. Furthermore, processor 1350 may receive other information 215, such as current mortgage interest rate information for various loan products, such as interest rates for jumbo loans, conventional loans, Veterans Administration (VA) loans, adjustable rate mortgage (ARM) loans, and any other interest rate information. Based on at, least one of the received information (205-215), processor 1350 may then determine the indication (labeled as likelihood indication 230) of whether a mortgage loan application is likely to close. Processor 1350 may determine likelihood indication 230 based on a model (labeled as Fallout Score model 220). Fallout Score model 220 is adapted to process the above received information and determine a likelihood indication 230. Processor 1350 may also provide, through communication channel 1400, likelihood indication 230 to any entity, such as lender 1500, appraiser 1600, or title company 1700.

Figure 3:
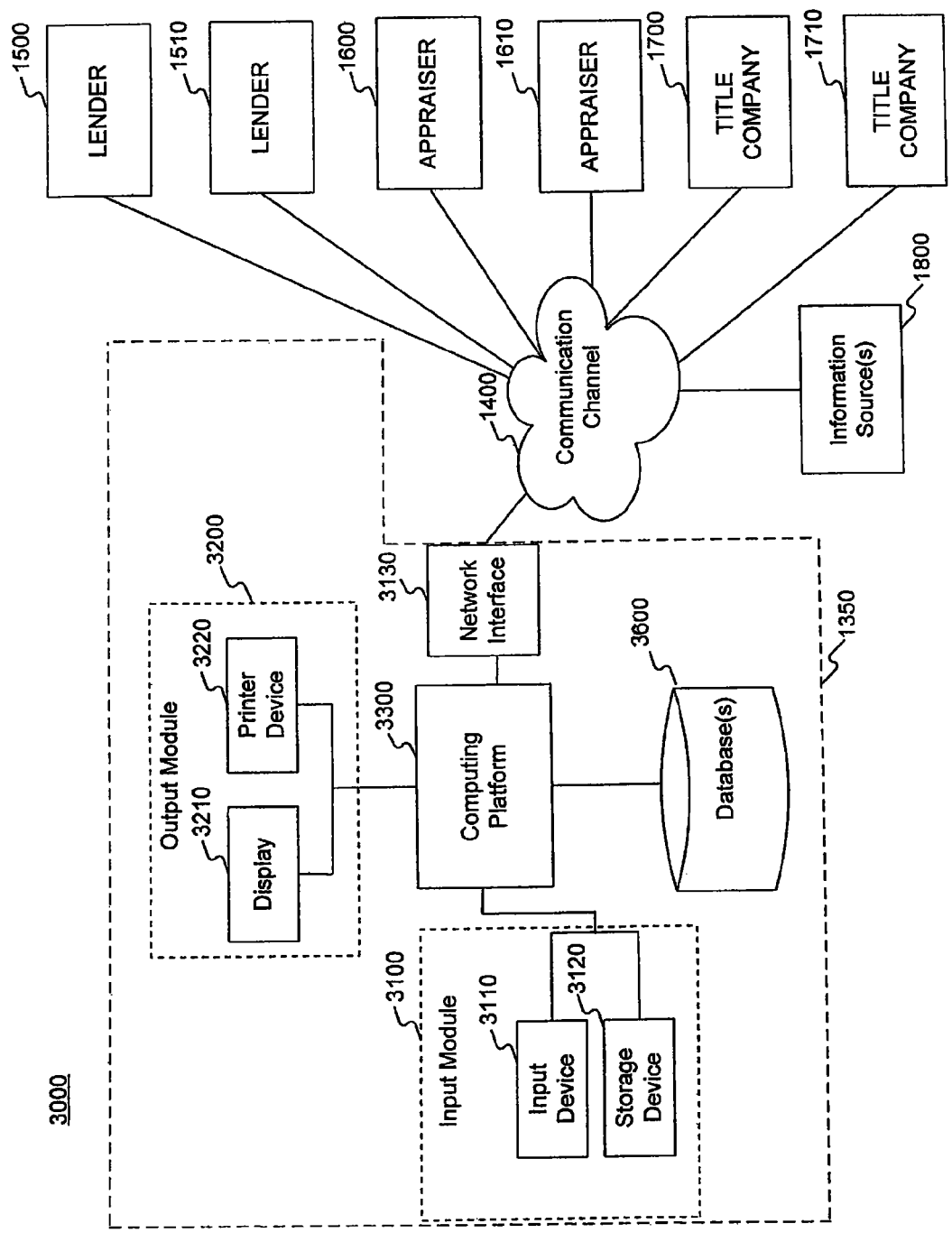
FIG. 3 is another exemplary system environment, consistent with the systems and methods of the invention.

FIG. 3 depicts the exemplary system 1000 of FIG. 1 in greater detail with respect to processor 1350. As illustrated in FIG. 3, the system environment 3000 includes communication channel 1400, one or more lenders 1500,1510, one or more borrowers 1600, 1610, one or more title companies 1700, 1710, information source(s) 1800, and processor 1350. Processor 1350 may further include an input module 3100, an output module 3200, a computing platform 3300, a database(s) 3600, and network interface 3130.

In one embodiment consistent with FIG. 3, the computing platform 3300 may include a data processor such as a PC, UNIX server, or mainframe computer for performing various functions and operations. Computing platform 3300 may be implemented, for example, by a general purpose computer or data processor selectively activated or reconfigured by a stored computer program, or may be a specially constructed computing platform for carrying out the features and operations disclosed herein. Moreover, computing platform 3300 may be implemented or provided with a wide variety of components or systems including, for example, one or more of the following: central processing unit, co-processor, memory, registers, and other data processing devices and subsystems.

Communication channel 1400 may include, alone or in any suitable combination, a telephony-based network, a local area network (LAN), a wide area network (WAN), a dedicated, intranet, the Internet, a wireless network, a bus, or a backplane. Further, any suitable combination of wired and/or wireless components and systems may be incorporated into communication channel 1400. Moreover, communication channel 1400 may be embodied as bi-directional links or as unidirectional links.

Although computing platform 3300 may connect to lenders 1500, 1510, appraisers 1600, 1610, and/or title companies 1700, 1710 through network interface 3130 and communication channel 1400, computing platform 3300 may also connect directly to lenders 1500, 1510, appraisers 1600,1610, and/or title companies 1700, 1710.

Computing platform 3300 also communicates with input module 3100 and/or output module 3200 using connections or communication links, as illustrated in FIG. 3. Alternatively, communication between computing platform 3300 and input module 3100 or output module 3200 may be achieved using a network (not shown) similar to that described above for communication channel 1400. A skilled artisan would recognize that computing platform 3300 may be located in the same location or at a geographically separate location from input module 3100 and/or output module 3200 by using dedicated communication links or a network.

Input module 3100 may be implemented with a wide variety of devices to receive and/or store information. Referring to FIG. 3, input module 3100 may include an input device 3110 and/or a storage device 3120. Input device 3110 may further include a keyboard, a mouse, a disk drive, a telephone, or any other suitable input device for receiving and/or providing information to computing platform 3300. Although FIG. 3 only illustrates a single input module 3100, a plurality of input modules 3100 may also be used. Storage device 3120 may be implemented with a wide variety of systems, subsystems and/or devices for providing memory or storage including, for example, one or more of the following: a read-only memory (ROM) device, a random access memory (RAM) device, a tape or disk drive, an optical storage device, a magnetic storage device, a redundant array of inexpensive disks (RAID), and/or any other device capable of providing storage and/or memory.

Network interface 3130 may exchange data between the communication channel 1400 and computing platform 3300. In one embodiment of the invention, network interface 3130 may permit a connection to at least one or more of the following networks: an Ethernet network, an Internet protocol network, a telephone network, a radio network, a cellular network, a wireless local area network (LAN), or any other network capable of being connected to input module 3100.

Output module 3200 may include a display 3210 and/or a printer 3220. Output module 3200 may be used to display and/or print, inter alia, the indication, such as a score, representative of the likelihood that a mortgage loan application may result in a closing. Moreover, output module 3200 may be used to print or display any information received, such as mortgage loan application information, title information, current interest rate information, and/or home valuation information. Although FIG. 3 only illustrates a single output module 3200, a plurality of spatially separated output modules 3200 may be used.

For one or more mortgage loan applications, database 3600 may store mortgage loan application information 205, home value information 210, and/or other information 215. Moreover, database 3600 may store information including financial information, demographic information, real estate information, credit information, and other public and/or proprietary information that is kept within an entity or organization. For example, database 3600 may store information received from information source(s) 1800, such as interest rate information, points and fees paid at application and later, credit history, credit ratings (or scores), estimates of property values, median and/or average housing pricing in, a region (e.g., a street, neighborhood, ZIP code, city, county, or state). The information stored in database 3600 may be received from any server including information source(s) 1800 and/or entities 1500-1710. Although database 3600 is shown in FIG. 3 as being located with computing platform 3300, a skilled artisan would recognize that the database (or databases) may be located anywhere (or in multiple locations) and connected to computing platform 3300 via direct links or networks.

Figure 4:
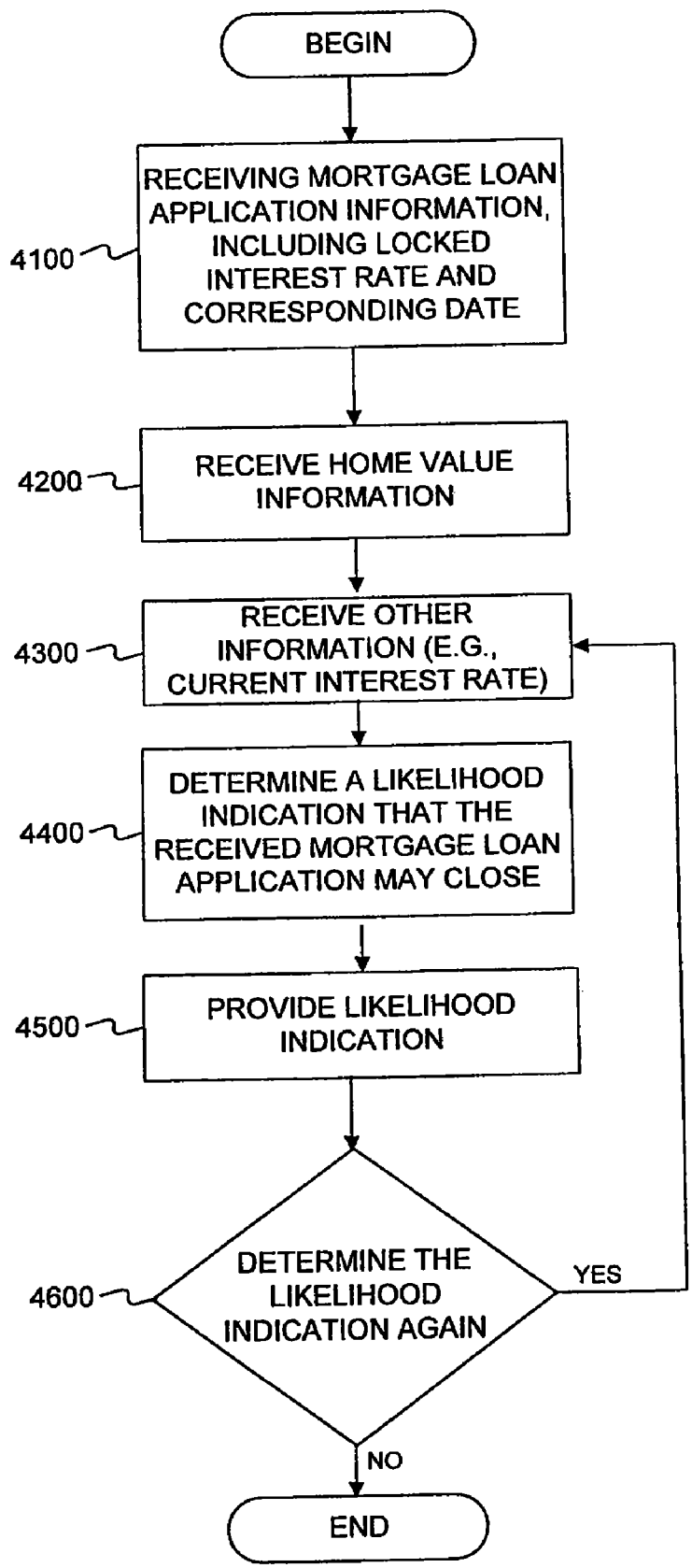
FIG. 4 is an exemplary flowchart for determining an indication that a mortgage loan may close, consistent with the systems and methods of the invention.

FIG. 4 is a flowchart depicting exemplary steps for providing an indication that a mortgage loan application results in a closing. Referring to FIGS. 3 and 4, in one embodiment, processor 1350 may receive mortgage loan application information including, a locked mortgage interest rate and a corresponding date that represents the last day of the lock-in period (or a possible closing date) (step 4100). Processor 1350 may also receive home value information (step 4200) and other information (step 4300), such as current interest rates applicable to the mortgage loan application, as well as points and fees paid (or to be paid) by the borrower. Based on at least one of the received mortgage loan application information, received home value information, and other received information, processor 1350 may determine a likelihood that the received mortgage loan application may result in a closing (step 4400). Processor 1350 may then provide, through communication channel 1400, the likelihood indication to an entity, such as lender 1500 (step 4500). In one aspect of the invention, processor 1350 may repeat the process of determining the likelihood indication (step 4600). For example, if a mortgage loan application has a 30-day lock guaranteeing the locked mortgage interest rate for 30 days, processor 1350 may repeatedly (e.g., daily or weekly) determine the likelihood indication. With that general overview, the following describes in greater detail exemplary steps 4100-4600.

Figure 5:
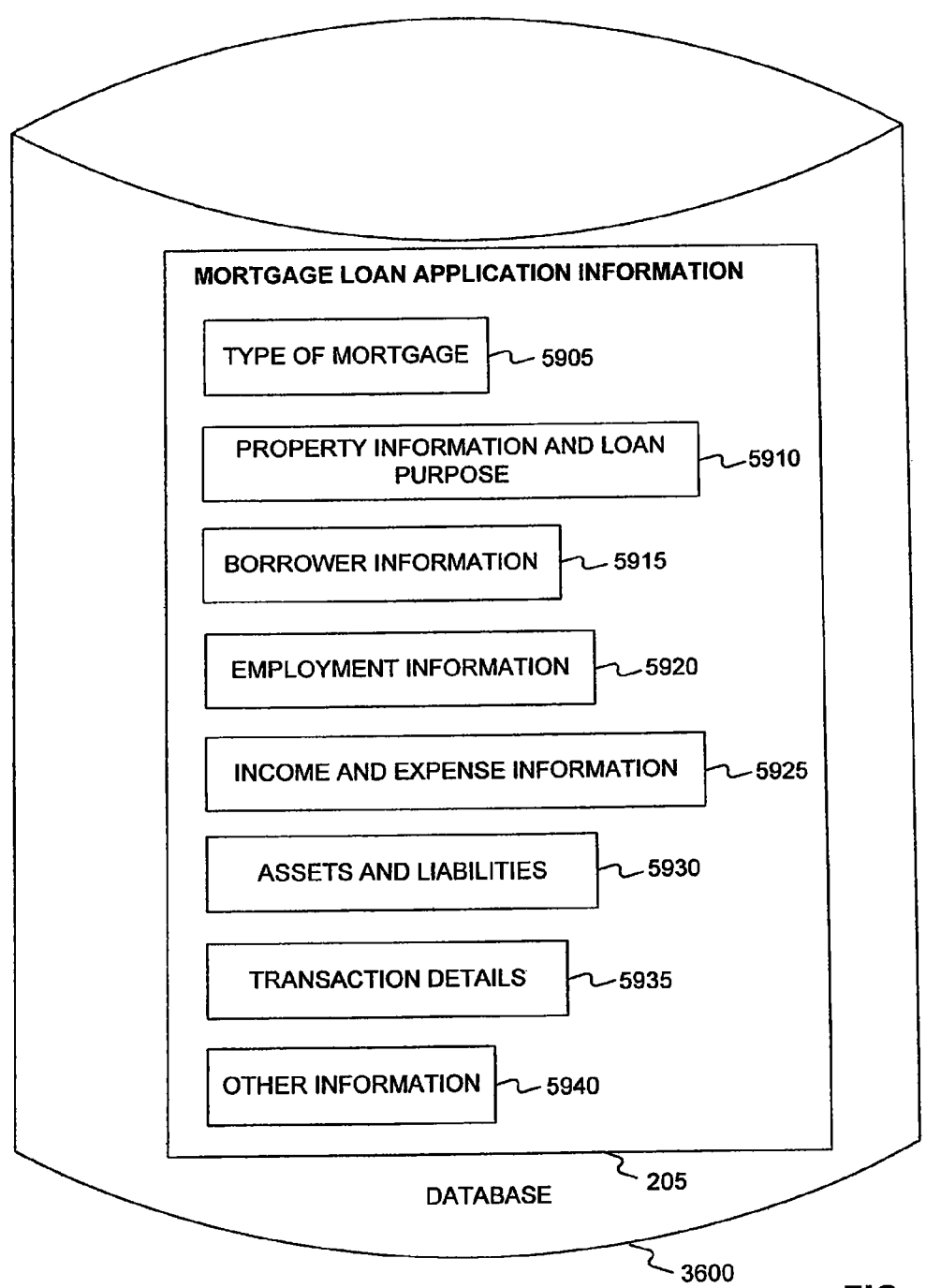
FIG. 5 illustrates an exemplary database for storing mortgage loan application information, consistent with the systems and methods of the invention.

To receive mortgage loan application information (step 4100), processor 1350 may receive from an entity, such as lender 1500, mortgage loan application information 205 through communication channel 1400. FIG. 5 depicts database 3600 with an example of mortgage loan application information 205. Referring to FIG. 5, mortgage loan application information 205 (also referred to as application-level) includes one or more of the following: type of mortgage 5905, property information and loan purpose information 5910, borrower information 5915, employment information 5920, income and expense information 5925, assets and liability information 5930, transaction details 5935, and other information 5940.

Type of mortgage information 5905 describes the type of mortgage and includes one or more of the following: type of mortgage applied for, such as Veterans Administration (VA), Fair Housing Administration (FHA), or conventional; a lender case (or tracking) number; interest rate information, such as fixed or adjustable, whether the loan amortizes or is interest only, whether any credit enhancements are involved, such as additional collateral or mortgage insurance.

Property information and loan purpose information 5910 describes the subject property and/or the reason for the loan, and includes one or more of the following: address of the subject property; year subject property was built; number of units on the subject property address; purpose of the loan, such as whether the loan funds will be used to purchase, refinance, construct the property, provide cash-out from the equity, or replace a construction loan with a permanent loan; whether the subject property is the borrower's primary residence, secondary residence, or is held for investment; the name(s) of proposed title holders of the subject property; type of ownership interest, such as fee simple or leasehold; and source of down payment (e.g., from savings and/or from borrowed funds).

Borrower information 5915 generally describes the borrower(s) and includes one or more of the following: borrower name; Social Security Number; phone number; age; years of school; marital status; number of dependents; and address of borrower.

Employment information 5920 provides a borrower's employment information and includes one or more of the following: current and prior employer names and addresses; years with each employer; positions (or titles); and borrower's current business phone.

Income and expense information 5925 describes any sources of gross income to borrower(s) and any sources of expense, and includes one or more of the following: base employment income; income from overtime; bonuses, commissions; professional fee income; alimony; dividend income; interest income; rental income; rental expense; current mortgage expense; insurance fees; real estate taxes; home owner association dues; and mortgage insurance.

Assets and liability information 5930 describes any assets held by the borrower(s) and any liabilities, and includes one or more of the following: cash deposits; checking accounts; savings accounts; stocks; bonds; mutual funds; life insurance net cash value; real estate assets (e.g., current, market value); vested interest in a retirement account; mortgage liability; loan balances; credit card debt; student loan; alimony; child support; separate maintenance; child care; and union dues.

Transaction details 5935 describe the details of the real estate transaction and includes one or more of the following: purchase price of the subject property; loan amount; term of loan; alterations, improvements, repairs to the subject property; land cost (when purchased separately); prepaid items; points paid; fees paid at application or to be paid at closing, closing costs; property mortgage insurance (PMI); discounts; credits; and cash from (or to) borrower.

Other information 5940 includes one or more of the following: locked interest rate; the number of days that the locked interest rate is guaranteed (e.g., 30-day, 45-day, or 60-day lock); and the proposed closing date (or last day of lock-in period) for the mortgage application.

Referring again to FIG. 4, to receive home value information 210 (step 4200), processor 1350 may receive home value information 210 from information source(s) 1800. Home value information 210 may provide a valuation estimate of the subject property. The valuation estimate may be provided by any means including a conventional in-person appraisal of the subject property, a broker's opinion of the value (also known as a broker's price opinion), or by the use of an automated home valuation. An example of an automated home valuation estimator is Home Value Explorer®, which generates a property value estimate. Moreover, the home value information may also include information concerning the value of homes surrounding the subject property. For example, the median and/or average estimated home price for a region, such as a street, neighborhood, ZIP code, city, state, or MSA (metropolitan statistical area) may be received by processor 1350 as home value information.

Examples of automated home valuation models may also be found in one or more of the following applications: U.S. patent application Ser. No. 08/730,289, filed Oct. 11, 1996, entitled "METHOD FOR COMBINING HOUSE PRICE FORECASTS," U.S. patent application Ser. No. 09/115,831, filed Jul. 15, 1998, entitled "SYSTEM AND METHOD FOR PROVIDING HOUSE PRICE FORECASTS BASED ON REPEAT SALES MODEL," U.S. patent application Ser. No. 09/134,161, filed Aug. 14, 1998, entitled "SYSTEM AND METHOD FOR PROVIDING PROPERTY VALUE ESTIMATES," U.S. patent application Ser. No. 09/728,061, filed Dec. 4, 2000, entitled "METHOD FOR FORECASTING HOUSE PRICES USING A DYNAMIC ERROR CORRECTION MODEL."

Figure 6:
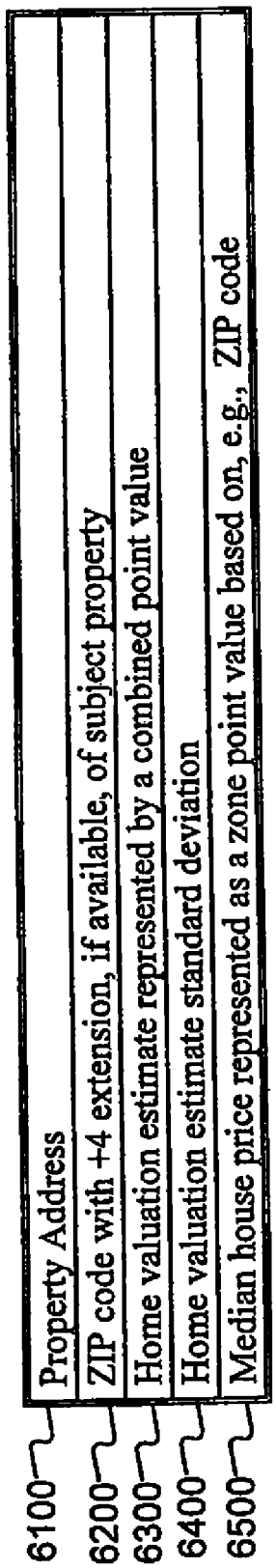
FIG. 6 illustrates exemplary home value information that may be received, consistent with the systems and methods of the invention.

FIG. 6 depicts an example of home value information 210. Referring to FIG. 6, the home value information 210 may include the address of the subject property 6100, a ZIP code 6200, a valuation estimate for the subject property 6300, a standard deviation for that home value estimate 6400, and a median house price 6500 based on ZIP code 6200. The standard deviation represents any error associated with the model(s) used in generating the home valuation estimate.

Although the home valuation estimates may be represented in dollars, the home valuation estimates may, alternatively, be described as point values, such as a combined point value or a zone point value. The combined point value, provided by a home valuation estimator, is a property value estimate based on factors that contribute to property value, such as comparable housing sales, number of bedrooms, and number of bathrooms. A higher combined point value thus represents a relatively higher valued home. Similarly, the zone point value is an estimate of the average (or median) property value in a zone or region, and is based on factors that contribute to average property value in an area or region, such as comparable sales and median income. A higher zone point value also represents a relatively higher average (or median) property value for a region.

To receive other information (step 4300), processor 1350 may receive, through communication channel 1400, interest rate information. For example, processor 1350 may receive daily current interest information for various mortgage products, such as 30-year fixed rate mortgages, 30-year jumbo fixed rate mortgages, adjustable rate mortgages, 15-year fixed mortgages, 10-year fixed mortgages, and/or interest only mortgages. The current interest rate information may be received from a source of such information such as lenders and financial publications (e.g., interest rates offered on a daily basis by a lender) whether provided orally, electronically, or in tangible written form. In addition to current interest rates, processor 1350 may also receive an indication of interest rate volatility (described in greater detail below) corresponding to the amount of interest rate fluctuation over a time period, such as 30 or 60 days. Furthermore, processor 1350 may receive an indication of workflow required for the mortgage loan application. For example, processor 1350 may receive information indicating whether all required (or necessary) documents have been prepared (or completed) before closing, whether the appraisal has been performed, and whether a title search has been completed.

To determine a likelihood indication that the received mortgage loan application will close with the locked mortgage interest rate (step 4400), processor 1350 may process the mortgage loan application information 205, home value information 210, and other information 215 received in steps 4100-4300. In one embodiment, processor 1350 determines the likelihood indication in the form of a score. The score (also referred to herein as a Fallout Score) provides an indication of whether the mortgage loan application may result in a closing with the locked mortgage interest rate. The score may further indicate whether closing will occur on or before a specified date, such as a closing date or the last day of, e.g., a 30-day lock period.

In one aspect of the invention, the Fallout Score is scaled into a range of 300 to 900 such that a Fallout Score of 300 indicates a greater likelihood that a mortgage application will not close. On the other hand, a Fallout Score of 900 would indicate that the mortgage application is likely to close. Alternatively, the Fallout Score may be scaled into a range such that a lower score, e.g., 300, indicates that a mortgage application will probably close while a higher score, e.g. 900, indicates that it will probably not close.

In one aspect of the invention, the Fallout Score is determined based on a model as well as the received mortgage loan application information 205, received home value information 210, and other received information 215. The information received in steps 4100-4300 are used to initialize (or set) the values of variables in the model, such as Fallout Score model. Table 1 below lists exemplary variables that may be used in the Fallout Score model. To facilitate explanation of the model, only a select number of variables are listed and described in Table 1. However, a skilled artisan will recognize based on reading the detailed description herein that any number of variables may be used to determine a likelihood indication, such as the Fallout Score.

TABLE 1

EXEMPLARY FALLOUT SCORE VARIABLES

| | |
|---|---|
| INTEREST_RATE_SPREAD = | locked mortgage interest rate - current interest rate |
| DAYS_UNTIL_CLOSE = | number of days until the mortgage loan application closes |
| CS = | Credit Score expressed as an integer, e.g., 700 |
| MCRED = | 1 if Credit Score is missing, otherwise 0 |
| 30-day = | 1 if mortgage loan has a 30-day lock on the offered interest rate, else 0 |
| 60-day = | 1 if mortgage loan has a 60-day lock on the offered interest rate, else 0 |
| FIXED = | 1 if mortgage loan is for a fixed rate mortgage, else 0 |
| JUMBO = | 1 if mortgage loan is for a Jumbo type mortgage, else 0 |
| ARM = | 1 if mortgage loan is for an adjustable rate mortgage, else 0 |
| 30-YEAR = | 1 if mortgage loan is for a 30-year mortgage, else 0 |
| 15-YEAR = | 1 if mortgage loan is for a 15-year mortgage, else 0 |
| COMBINED_POINT_VALUE = | home value estimate of the subject property represented as a point value on a normalized scale, such as 1 to 1000. |
| ZONE_POINT_VALUE = | median (or average) home value estimate in a region associated with the subject property, where the value estimate is represented as a point value on a normalized scale, such as 1 to 1000. |
| PURCHASE = | 1 if mortgage loan purpose is for a home purchase, else 0 |
| REFINANCE = | 1 if mortgage loan purpose is for a refinance, else 0 |
| CASH_OUT = | 1 if mortgage loan purpose includes cash paid to borrower, else 0 |
| NUMBER_POINTS_PAID = | number of points paid by the borrower at closing |
| FEEPCT = | Fees paid at application as a percent of loan amount. |
| LTV = | loan to value ratio of the property |
| VOLATILITY = | a standard deviation based on the standard deviation of interest rates over a period of time |
| DOCS_DRAWN = | 1 if the mortgage loan application has all necessary pre-closing paperwork completed and is merely waiting for an appraisal (or title search), else 0 |

The variable "INTEREST_RATE_SPREAD" corresponds to the difference between a currently available (i.e. available as of the time of the analysis) interest rate and the locked mortgage interest rate for the mortgage application. For example, a borrower submits a mortgage application and is offered an interest rate (e.g., 5%) that is locked for 30 days, so that if the borrower closes within 30 days, the mortgage is financed at 5%. However, during the 30 day period, interest rates on mortgages may fluctuate above or below the locked mortgage interest rate. In this example, the currently available interest rate interest may rise to 5.5% or fall to 4.5%. In the case when the currently available interest rate rises to 5.5%, the INTEREST_RATE_SPREAD is equal to −0.5% (locked in rate of 5.0%-5.5% currently available interest rate). Here, the borrower is better off keeping in the lower locked rate. In the case when the currently available interest rate falls to 4.8%, the INTEREST_RATE_SPREAD is equal to +0.2% (−5% locked in interest rate −4.8% currently available interest rate). With a 0.2% lower interest rate, the borrower may be tempted to abandon closing the loan transaction and thus fallout of the mortgage loan application process, since interest rates are lower elsewhere. The value of INTEREST_RATE_SPREAD is just one of the factors (or variables) considered when determining the likelihood that a mortgage loan application will proceed to close or whether the loan will fall out (not close).

The variable "DAYS_UNTIL_CLOSE" represents the number of days until the mortgage loan application closes. For example, a mortgage with a 30-day lock may have 30 days or fewer days until closing, so that on the day of closing the variable DAYS_UNTIL_CLOSE has a value of "0."

The variable "CS" represents a credit score for the borrower and is expressed as an integer. For example, a credit score may provide an indication of the credit risk associated with a borrower. A borrower that is a high credit risk (more likely to default) may have a low credit score, e.g., 400. On the other hand, a borrower that is a low credit risk may have relatively higher credit score, e.g., 800. The variable "MCRED" corresponds to a value of 1 if a credit score is missing for the borrower; otherwise, MCRED has a value of 0.

The variable "30-day" corresponds to a value of 1 if the mortgage loan application includes a 30-day lock on the interest rate offered to the borrower. Otherwise, the value of the variable 30-Day is 0. The variable "60-day" corresponds to a value of 1 if the mortgage application includes a 60-day lock on the offered interest rate, and to a value of 0 otherwise. The variable "FIXED" corresponds to a value of 1 if the mortgage loan application is for a fixed rate mortgage type or to a value of 0 otherwise. The variable "JUMBO" corresponds to a value of 1 if the mortgage loan application is for a jumbo type mortgage (e.g., higher valued mortgage loans), or to a value of 0 otherwise. The variable "ARM" corresponds to a value of 1 if mortgage loan application is for an adjustable rate mortgage, and otherwise to a value of 0. The variable "30-YEAR" corresponds to a 1 if the mortgage loan application is for a 30-year mortgage and otherwise to a value of 0. The variable "15-YEAR" corresponds to a 1 if the mortgage loan application is for a 15-year mortgage, and to a 0 otherwise.

The variable "COMBINED_POINT_VALUE" provides a loan-level factor in determining the Fallout Score. The variable COMBINED_POINT_VALUE represents a valuation estimate of the subject property. Although the valuation estimate may be represented in dollars, it may be normalized on a point scale, such as 1 to 1000. For example, the COMBINED_POINT_VALUE of a 1 bedroom home with 1 bathroom may be 500 while the COMBINED_POINT_VALUE of a higher value 5 bedroom 4 bath home may be 600. The COMBINED_POINT_VALUE thus represents a property's estimated market value.

The variable "ZONE_POINT_VALUE" corresponds to the median (or average) valuation estimate for properties in a region associated with the subject property. Although the median (or average) valuation estimate for a region may be represented in dollars, the ZONE_POINT_VALUE may be normalized on a point scale, such as 1 to 1000. Returning to the above example, the ZONE_POINT_VALUE for the region associated with the two properties above may be 650.

The purpose of the loan, such as whether the loan is for a purchase, refinance, or cash out mortgage may also be considered. For example, the variable "PURCHASE" is set to a value of 1 if the mortgage loan purpose is for a home purchase, and otherwise to a value of 0. The variable "REFINANCE" corresponds to a value of 1 if mortgage loan purpose is for a refinance and otherwise to a value of 0. The variable "CASH_OUT" corresponds to a value of 1 if mortgage loan purpose includes cash paid to the borrower and otherwise to a value of 0.

The variable "NUMBER_POINTS_PAID" corresponds to the number of points paid, if any, by the borrower at closing.

The variable "FEEPCT" corresponds to the amount of fees paid by the borrower at loan application, as a percentage of the loan amount. Alternatively, the dollar amount of fees may be used as a variable.

The value of the variable "LTV" (loan-to-value) may correspond to the ratio of the loan amount to the fair market value of the property multiplied by 100. For example, a mortgage of $100,000 on a property valued at $200,000 would have an "LTV" of 50. The LTV ratio may also be expressed as a decimal. In this case, the LTV ratio would be 0.50.

The variable "VOLATILITY" represents the standard deviation (or variance) associated with mortgage interest rates over a time period. For example, the standard deviation of mortgage interest rates may be determined over a 30-day period. In this example, if mortgage interest rates fluctuate very little (or not at all) over the 30 days, the standard deviation will be relatively low. If the mortgage rates fluctuate considerably over the 30 days, the standard deviation may be relatively higher when compared to the case when it changes very little (or not at all). Larger values of the standard deviation represent a larger amount of interest rate volatility. As such, when the variable VOLATILITY is relatively low, interest rates are stable (i.e., not volatile), while a relatively higher value of VOLATILITY represents a higher degree of interest rate volatility.

The variable "DOCS_DRAWN" corresponds to a value of 1 if the lender has completed (or drawn) all necessary preclosing documents, and otherwise to a value of 0. The "DOCS_DRAWN" variable represents an event in the workflow associated with processing a mortgage loan application. Although the documents drawn event is described herein, any other workflow events may be used instead of or in addition to "DOCS_DRAWN," such as the appraisal completion date or title search completion date.

FIG. 7 depicts an exemplary Fallout Score model. Based on the exemplary Fallout Score model depicted in FIG. 7, processor 1350 (or computing platform 3300 therein) may determine a Fallout Score by first determining the product(s) of the model coefficient(s) and the corresponding variable(s) (lines 1-21). For example, computing platform 3300 may determine the product of the model coefficient "500" and the value of the variable INTEREST_RATE_SPREAD (described above) by multiplying these two values (line 2). As illustrated in FIG. 7, the computing platform 3300 then sums all of the determined products to produce a Fallout Score. One skilled in the art may add, modify, or use any combination of these variables to produce a Fallout Score and/or Fall Out Score model.

With the Fallout Score determined, processor 1350 may provide the determined Fallout Score to an entity, such as lender 1500, through network interface 3130 and communication channel 1400 (step 4500). The Fallout Score may be provided though a network interface, such as a web browser.

FIG. 8 depicts an exemplary web page with a Fallout Score that is provided to an entity, such as lender 1500. As illustrated in FIG. 8, the Fallout Score may provide lender 1500 with an indication of whether the mortgage loan application will fallout, i.e., not proceed to closing. For example, FIG. 8 depicts that a Fallout Score below 500 may be considered at "highest risk" of falling out (or not closing). When that is the case, lender 1500, appraiser 1600, or title company 1700 may allocate their resources accordingly. For example, when the Fallout Score is below 500, an appraiser may perform an in-person appraisal for the subject property after performing another (or second) appraisal on other higher Fallout Score properties. A Fallout Score between 500 and 700 may be considered at "moderate risk" of falling out. When a Fallout Score is above 700, the likelihood that a mortgage application will fallout is at "lowest risk" (likely to result in a closing). With a higher relative score, the mortgage application with a Fallout Score above 700 may be given priority and processed before other lower scoring mortgage loan applications.

In some instances, processor 1350 may determine the Fallout Score repeatedly until the mortgage loan application closes (step 4600). In one embodiment, processor 1350 may repeat steps 4200-4500 on a daily basis until the loan closes. In another case, processor may perform an initial Fallout Score determination, and then determine another Fallout Score 15 days before the proposed mortgage closing date (or the end of the lock-in period).

In one embodiment, an appraiser may receive one or more scores for properties requiring an appraisal. The appraiser may then perform the appraisals based on the Fallout Score. For example, the appraiser may prioritize completion of the appraisal of a property that is more likely to result in a closing, based on the Fallout Score, than another property that is less likely to result in a closing.

In another embodiment, a title company may receive one or more scores for properties requiring title searches, and then perform the title searches based on the Fallout Score. For example, the title searcher may first perform title searches on properties that are more likely to result in a closing based on the Fallout Score, than on those properties that are less likely to result in closings.

Figure 9:
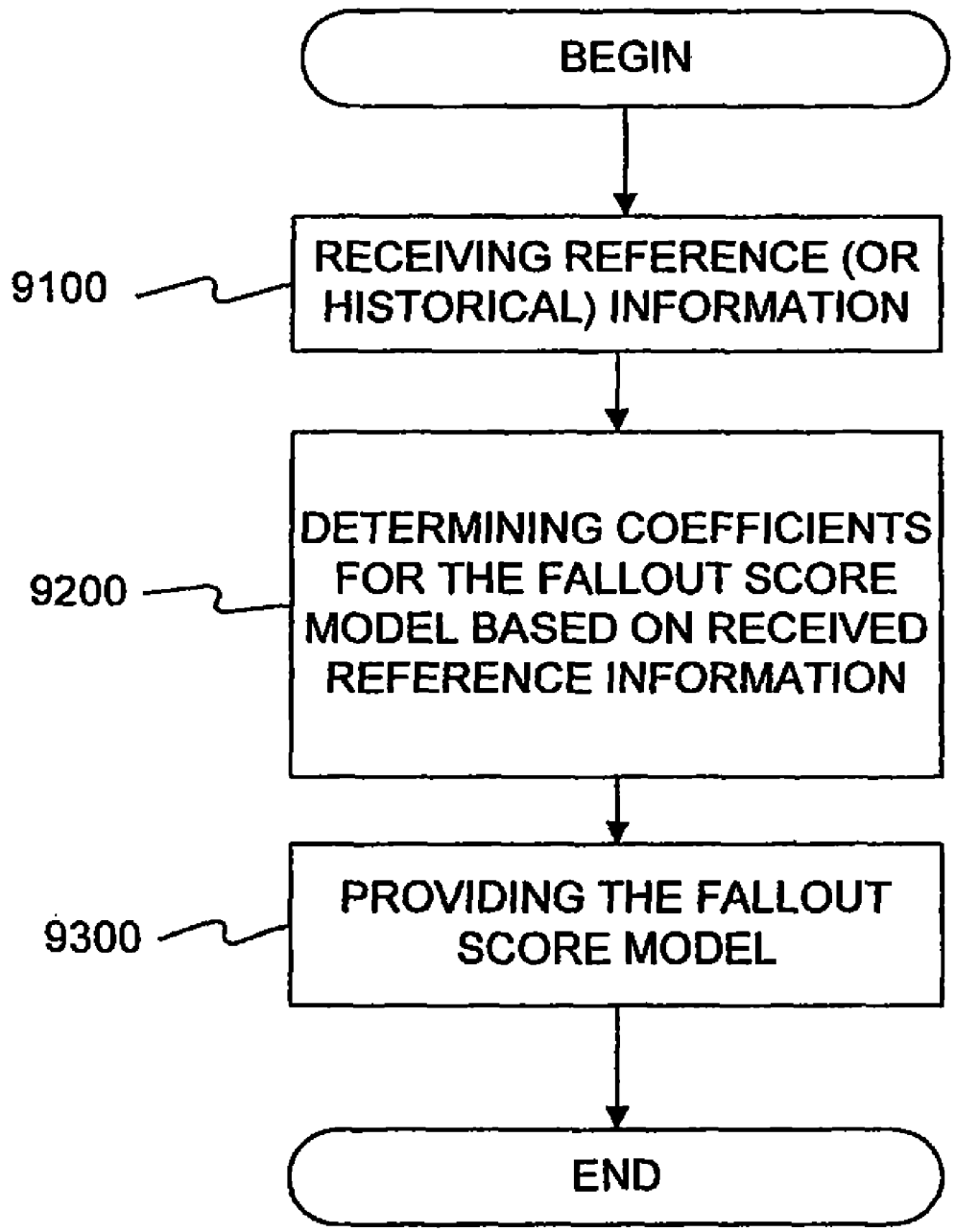
FIG. 9 is an exemplary flowchart for generating a model, consistent with the systems and methods of the invention.

In one embodiment, processor 1350 (or computing platform 3300 therein) may also generate the Fallout Score model. Although the Fallout Score model is described, any type of model or mathematical transform may be used instead. FIG. 9 shows a flowchart depicting the steps associated with generating the Fallout Score model. Computing platform 3300 may receive reference (also referred to by those of ordinary skill as "historical" or "truth") information (step 9100); determine one or more coefficients (or weights) for the Fallout Score model based on the received reference information (step 9200); and then provide the Fallout Score model (step 9300), so that it can be used to generate Fallout Scores.

Computing platform 1300 may receive from information source(s) 1800 or database 3600 reference information for one or more mortgage loan applications (also referred to herein as "reference mortgage applications") (step 9100). The reference information may include mortgage loan application information, home value information, and any other information, such as interest rate information available before the mortgage loan closed. In addition, the reference information identifies whether each of the reference mortgage applications closed. For example, a reference mortgage application may include a 30-day lock, the corresponding locked mortgage interest rate, the closing date, and daily interest rate information for each of the 30 days leading up to closing. The reference information may include information that is considered reliable and, preferably, verified (e.g., "truth" data).

To determine the coefficients (step 9200), computing platform 3300 may process the reference information received in step 9100 based on statistical techniques, such as a logistic regression. By using statistical techniques, computing platform 3300 may determine the corresponding coefficients (or weights) of the Fallout Score model, such that the model can determine a Fallout Score. Referring again to FIG. 7, the exemplary Fallout Score model lists coefficients including the following: +600, +500, +50, +1, −0.5, +5 +1, +10, +20, +3.5, −5, −20, +100, +100, +3, +20, +10, +10, −10, +2, +20, and +100. Computing platform 3300 thus uses a statistical technique to determine each of these coefficients.

In one embodiment, computing platform 3300 may use a statistical technique referred to as logistic regression to determine the coefficients of step 9200. Logistic regression models may be used to examine how various factors influence a binary outcome. An event (or result) that has two possible outcomes is a binary outcome (e.g., good/bad or close/not close). Logistic modeling is available with many statistical software packages. For example, the commercially available statistical packages offered by SAS Institute Inc. include logistic regression modeling tools.

Figure 10:
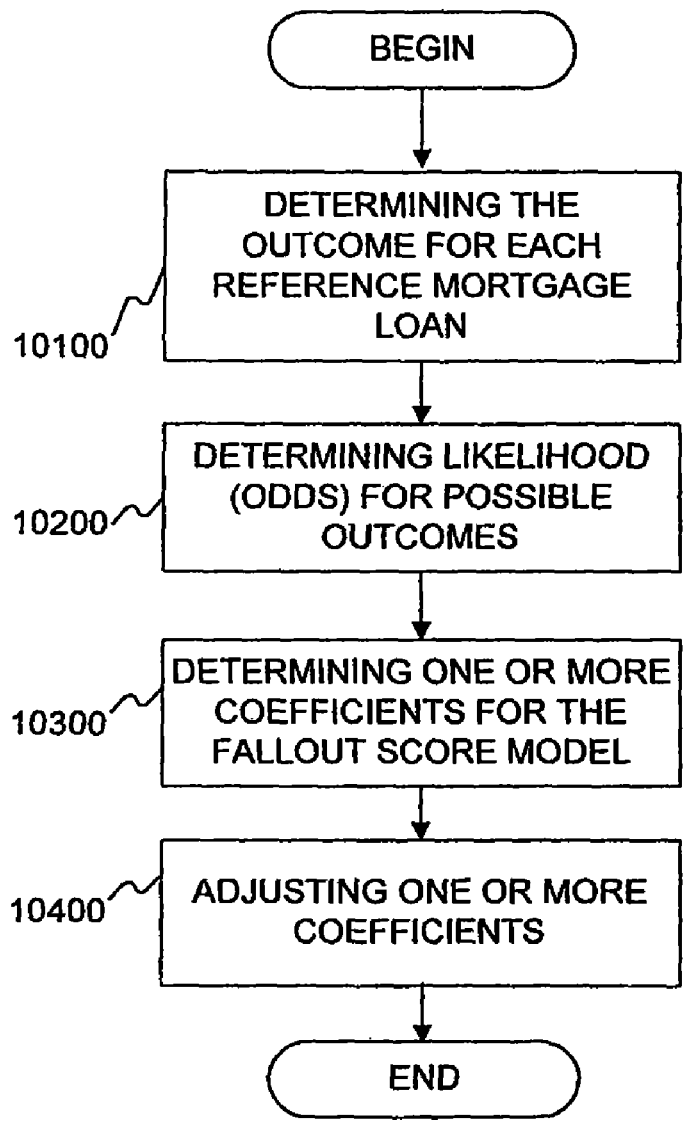
FIG. 10 is an exemplary flowchart for determining model coefficients, consistent with the systems and methods of the invention.

FIG. 10 shows an exemplary flowchart with steps for determining coefficients of a model, such as the Fallout Score model, based on a logistic regression approach. The logistic regression approach permits determining coefficients for the Fallout Score model based on the reference information received in step 9100. Referring to FIG. 10, computing platform 3300 may determine the outcome (e.g., whether the reference mortgage application closes) for each loan included in the reference information (step 10100); determine the likelihood (or probability) associated with each of those outcomes (step 10200); determine one or more coefficients (or weights) for the Fallout Score model (step 10300); and adjust the one or more coefficients by scaling them into a range (step 10400). With that general overview, steps 10100-10400 will be described below in greater detail.

To determine the outcome for each of the reference mortgage loan applications included in the reference information (step 10100), computing platform 3300 may determine whether the mortgage loan application closed or not (i.e., was a fallout). When a mortgage loan application closes, computing platform 3300 may set the outcome to a value of "1." When a mortgage loan does not close, computing platform 3300 may set the outcome to a "0."

Alternatively, the outcome may be defined as whether the mortgage closes within a time period, such as within 15 days. For example, for each of the loans included as reference information, if the loan closes within 15 days of specified date, then the outcome is set to a "1" indicating a closing. When a loan fails to close within those 15 days, the outcome is set to a "0."

FIG. 11 depicts a table associated with generating the Fallout Score model. Referring to FIG. 11, the reference information includes "N" reference mortgage loan application of which loan numbers 1, 4, and N closed (as indicated by the closing date), while loan numbers 2 and 3 failed to close (as indicated by "NONE"). Computing platform 3300 thus processes each reference mortgage loan application to determine an outcome, storing the information depicted in FIG. 11 in database 3600.

Referring again to FIG. 10, computing platform 3300 may determine the likelihood (or odds) for each of the possible outcomes (step 10200). To determine the likelihood, computing platform 3300 may further process the reference information, using a logistic regression, to determine the odds that an outcome is possible. For example, the computing platform 3300 may determine the likelihood that a mortgage application closes (or, alternatively, falls out) based on the following variables (or factors): INTEREST_RATE_SPREAD, VOLATILITY, CREDIT_SCORE, COMBINED_POINT_VALUE, and DOCS_DRAWN.

In one embodiment, computing platform 3300 uses the following equation to determine the odds, or likelihood that an outcome, such as a faulty appraisal, is possible:

$$\text{Log}(p/1-p)) = a + b_1(\text{INTEREST\_RATE\_SPREAD}) + b_2 \\ (\text{VOLATILITY}) + b_3(\text{CREDIT\_SCORE}) + b_4 \\ (\text{COMBINED\_POINT\_VALUE}) + b_5(\text{DOCS\_} \\ \text{DRAWN}) + \ldots b_n(\text{other variables}) \quad \text{Equation 1}$$

where $\text{Log}(p/(1-p))$ represents the log odds (also referred to as LOG IT) that the reference mortgage loan application is likely to close; p represents the probability of a reference mortgage loan application having a "0" outcome (or a "1" outcome); $a, b_1, b_2, \ldots b_n$ represent the initial coefficients of the Fallout Score model; and n+1 represents the number of coefficients used in the Fallout Score model. Before computing platform 3300 utilizes a logistic regression, the values of $a, b_1, b_2, \ldots b_n$, and p may be unknown.

In this example, the computing platform 3300 uses six coefficients (i.e., n=6) corresponding to an intercept and the following five variables: INTEREST_RATE_SPREAD, VOLATILITY, CREDIT_SCORE, COMBINED_POINT_VALUE, and DOCS_DRAWN. Although this example uses six coefficients, a skilled artisan would recognize that additional coefficients and corresponding variables may be used instead. Indeed, any other variables (or factors) may be used that serve as an indication of whether a mortgage application is likely to close or not. The five variables described herein are only a select few of the many that can be used, and the selection of these five is only exemplary to facilitate explanation herein. Examples of other factors that may be used in the model, include the variables of the Table 1 above or any other information included in (or related to) a mortgage loan application.

Although p is an unknown value at the start of the logistic regression, p may conform to the following equation:

$$p = 1/(1+e^\tau) \quad \text{Equation 2}$$

where $\tau$ is the following:

$$\tau = a + b_1 * \text{INTEREST\_RATE\_SPREAD} + \\ b_2 * \text{VOLATILITY} + b_3 * \text{CREDIT\_SCORE} + \\ b_4 * \text{COMBINED\_POINT\_VALUE} + \\ b_5 * \text{DOCS\_DRAWN} + \ldots b_n * \text{Other variable(s)}. \quad \text{Equation 3}$$

Computing platform 3300 may then determine an estimate of the coefficients of the Fallout Score model (step 10300). That is, the computing platform 3300 may solve for an estimate of $a, b_1, b_2 \ldots b_n$ using equations 1-3.

Although computing platform 3300 may utilize a logistic regression approach as described in this example, a skilled artisan would recognize that any other approach may be used instead to determine the coefficients, such as the Probit regression approach available from SAS Institute Inc., standard regression, neural networks, classification trees, and any other statistical or quantitative approach that may provide coefficients based on reference information (or truth data).

Referring again to FIG. 10, to adjust the one or more of the coefficients determined in step 10300, computing platform 3300 may scale the coefficients $a, b_1, b_2, \ldots b_n$ (step 10400). In one embodiment, computing platform 3300 may scale the coefficients by multiplying each coefficient by the following equation:

$$\text{actual coefficient} = \text{initial coefficient} * (60/\ln(2)) \quad \text{Equation 4}$$

where ln is a natural logarithm. By using equation 4, computing platform 3300 may scale the initial coefficients such that every 60 Fallout Score points doubles the odds that a mortgage application is likely to close. The scaled coefficients may be used as the actual coefficients used in the Fallout Score model, such as the model illustrated in FIG. 7. Accordingly, computing platform 3300 may determine one or more coefficients for the Fallout Score model based on a logistic regression approach using reference information (see, e.g., step 9100) that describes one or more reference mortgage loan applications. Computing platform 3300 may then use the Fallout Score model to determine the Fallout Score.

The system 3000 may be embodied in various forms including, for example, a data processor, such as the computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with, the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include for example machine code, such as produced by a compiler, and files containing a high level code that can be executed by the computer using an interpreter.

Furthermore, although the embodiments above refer to processing information related to mortgage loans secured by improved real property, systems and methods consistent with the present invention may process information related to other types of loans or credit instruments, including those secured by property, such as automobiles and/or personal property. Moreover, although reference is made herein to using the Fallout Score to assess a residential property for a mortgage loan, in its broadest sense systems and methods consistent with the present invention may provide a score for any type of property including commercial property.

What is claimed is:

1. A computer-implemented method for determining an order for processing a plurality of mortgage loan applications, comprising:
   receiving, by a data processor from one or more databases, information representative of two or more mortgage loan applications, each of the mortgage loan applications being associated with a different borrower;
   determining, by the data processor for each of the two or more mortgage loan applications, a score based on the received information, the score representing a likelihood that the mortgage loan application will close; and
   comparing, using the data processor, the scores and determining, based on the comparison, an order for executing a workflow associated with preparing each of the mortgage loan applications for closing.

2. The method of claim 1, further comprising:
   executing the workflow for each of the mortgage loan applications based on the order, such that at least one of the mortgage loan applications is processed before another mortgage loan application based on the determined scores.

3. The method of claim 1, wherein determining an order comprises:
    prioritizing the two or more mortgage loan applications based on the determined scores.

4. The method of claim 1, wherein said receiving information representative of at least one of the mortgage loan applications further comprises:
    receiving a date corresponding to when the at least one mortgage loan application may be closed with a first interest rate.

5. A system for determining an order for processing a plurality of mortgage loan applications, comprising:
    means for receiving information representative of two or more mortgage loan applications, each of the mortgage loan application being associated with a different borrower;
    means for determining, for each of the two or more mortgage loan applications, a score based on the received information, the score representing a likelihood that the mortgage loan application will close; and
    means for comparing the scores and determining, based on the comparison, an order for executing a workflow associated with preparing each of the mortgage loan applications for closing.

6. The system of claim 5, further including:
    means for receiving a date corresponding to when at least one of the mortgage loan applications may be closed with a first interest rate.

7. A system comprising:
    at least one memory, comprising:
        code that receives application information for a first application, the application information including at least borrower information, property information, and a first interest rate;
        code that receives home value information representing an estimated value of the property;
        code that receives a second interest rate; code that determines a first indication based on the received application information, received home value information, and received second interest rate, the first indication representing a likelihood that the mortgage loan will close;
        code that compares the first indication to a second indication determined for a second application;
        code that determines, based on the comparison, an order for processing a first workflow associated with preparing the first application for closing and a second workflow associated with preparing the second application for closing; and
    at least one processor that executes said code in said memory.

8. The system of claim 7, further including:
code that receives a date corresponding to when at least one of the applications may be closed.

9. A system, comprising:
at least one memory, comprising:
    code that receives information representative of a mortgage loan application for a property;
    code that determines a score based on the received information, the score representing a likelihood that the mortgage loan application will close;
    code that determines, based on the score, an order for executing a workflow associated with preparing the mortgage loan application for closing; and
at least one processor that executes said code in said memory.

* * * * *